(12) United States Patent
Hiura et al.

(10) Patent No.: US 6,754,694 B1
(45) Date of Patent: Jun. 22, 2004

(54) CROSS-PLATFORM ARCHITECTURE TO HANDLE INTERNATIONAL TEXT IN INTERNET

(75) Inventors: Hideki Hiura, Union City, CA (US); Prabhat Hegde, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/514,537

(22) Filed: Feb. 28, 2000

(51) Int. Cl.$^7$ .......................... G06F 15/16; G06F 17/28
(52) U.S. Cl. .............................. 709/206; 341/90; 704/7; 704/8
(58) Field of Search ........................... 341/90; 345/467; 709/206, 207; 707/10, 513; 704/8, 7; 710/100–104

(56) References Cited

U.S. PATENT DOCUMENTS

| | | | | |
|---|---|---|---|---|
| 5,758,314 A | * | 5/1998 | McKenna | 704/8 |
| 5,784,069 A | * | 7/1998 | Daniels et al. | 345/467 |
| 5,794,039 A | * | 8/1998 | Guck | 707/103 R |
| 5,848,415 A | * | 12/1998 | Guck | 707/10 |
| 5,864,870 A | * | 1/1999 | Guck | 707/104.1 |
| 5,884,246 A | * | 3/1999 | Boucher et al. | 704/2 |
| 5,911,776 A | * | 6/1999 | Guck | 709/217 |
| 6,035,327 A | * | 3/2000 | Buckley et al. | 709/206 |
| 6,199,081 B1 | * | 3/2001 | Meyerzon et al. | 707/513 |
| 6,204,782 B1 | * | 3/2001 | Gonzalez et al. | 341/90 |
| 6,338,033 B1 | * | 1/2002 | Bourbonnais et al. | 704/3 |
| 6,393,456 B1 | * | 5/2002 | Ambler et al. | 709/200 |
| 6,512,448 B1 | * | 1/2003 | Rincon et al. | 340/7.51 |
| 6,523,063 B1 | * | 2/2003 | Miller et al. | 709/206 |

OTHER PUBLICATIONS

The Mozilla Organization. "Charset Detection Algorithms", publicly posted Oct. 11, 1999, <http://www.mozilla.org/quality/intl/chardetect.html>.*

Rotaru, Catalin. "Character Set Converters", mozilla.org, Dec. 14, 1998.*

"AIX Common Desktop Environment (CDE) 1.0 README", released Feb. 2, 1999, retrieved Mar. 13, 2003 from <http://www.rootunix.org/AIX/433dt.txt>.*

"AIX Version 4.3.3 README", released Aug. 19, 1999, retrieved Mar. 20, 2003 from <http://www.rootunix.org/AIX/433rel.txt>.*

"Unicode Support in the Solaris 7 Operating Environment" by Sun Microsystems, released 1998.*

Network Working Group. "Request for Comments (RFC) 2045: Multipurpose Internet Mail Extensions Part One: Format of Internet Message Bodies", Nov. 1996.*

Unicode Technical Committee. "The Unicode Standard: Version 2.1", Nov. 21, 1999.*

* cited by examiner

*Primary Examiner*—David Wiley
*Assistant Examiner*—George C Neurauter
(74) *Attorney, Agent, or Firm*—Beyer Weaver & Thomas, LLP

(57) ABSTRACT

Methodology that enables an email sender to view and send a message in substantially any desired character set, and apparatus to perform the methodology. The methodology and apparatus taught herein also enable email software to automatically display a message utilizing the proper character set or sets. This methodology and apparatus further enables mail software to automatically include in the mail message sufficient information to meet the previously defined needs utilizing standard MIME conventions.

According to one aspect of the present invention, there is provided a flexible flat file syntax that holds per-locale information about mail, based on MIME conventions. The information in the file is used to build a database that may be used by mail clients through a new API. The contents of the file can also be configured by users to fit their individual and specific mail needs.

19 Claims, 2 Drawing Sheets

CROSS-PLATFORM ARCHITECTURE TO HANDLE INTERNATIONAL TEXT IN INTERNET

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

FIELD OF THE INVENTION

The present invention relates to email systems. More particularly, the present invention relates to email systems capable of comprehend and utilize a plurality of character sets. More particularly still, the present invention teaches an email system which possesses the agility to attempt to automatically decode the character set of the message, based on a users preferred order.

BACKGROUND OF THE INVENTION

The Internet is an international environment, and Internet email should be adaptable to this fact. It is well known that the many languages in use around the world utilize a number of different alphabets, or scripts, to convey meaning. Moreover, there have arisen several standards, or encoding schemes, by which the character sets required to implement the world's languages are rendered computer-storable, computer-processable, and computer-readable. These facts, in sum, have rendered the polyglot languages of the world mutually unintelligible.

In the simple situation where a users sends an English-based email message to a second user whose machine is also configured to communicate with that second user in the English language, there is no guarantee that the first and second user's computers process English language based information in the same manner. By way of example, but not limitation, the first users computer might utilize ASCII to store, represent, or process a text message while the second users computer might utilize one of the Unicode standards. In order to alleviate this difficulty, the well known MIME extensions provide information, in the header of the MIME-based message, which information is required by the second user's computer to properly identified the character set required to present the text.

MIME (Multipurpose Internet Mail Extension) extends the format of Internet email to enable non-U.S.-ASCII textual messages, non-textual messages, multiparty message bodies, and non-U.S.-ASCII information in message headers. MIME allows the knowledgeable user to specify character sets (CHARSETS). There are certain character sets that are good for storing and others which are good for processing. There are others that are storage intensive and others that are processor intensive. Accordingly, there are many situations where it is necessary, or at least advantageous to convert between one CHARSET and another. If a given operating system has converters to convert data from one character set to another, the operating system can enable the conversion from one CHARSET to another.

Any two users whose systems have previously agreed on the language, and character set required to represent that language, experience little difficulty in communicating with one another. One problem arises when the user receives email messages from a plurality of other users, and this plurality of users utilize a number of different languages, or character sets to represent those languages.

Mozilla is one well-known methodology for trying a number of character sets on an incoming email message. Mozilla is seriously limited however, in that as opposed to providing an automated methodology to enable a plurality of character sets to be implemented simultaneously, it simply replaces the default character set on a user's browser, or email software with an alternative character set.

What is needed therefore is the methodology that will allow an email sender to create a message in substantially any desired character set or character sets. The methodology should further enable email software to automatically display a message utilizing the proper character set or character sets. This methodology should enable email software to automatically include in the email message sufficient information to meet the previously defined needs utilizing standard MIME conventions.

Simply put, email clients need automated code conversions between MIME and the code set of the current locale in order to exhibit truly global behavior. Code conversions should be platform-independent. Moreover, all plans residing on the platform including but not limited to email and browser applications should be able to transparently utilize the resulting interfaces to support global/international text.

SUMMARY OF THE INVENTION

The present invention teaches a methodology that allows an email sender to view and/or send a message in substantially any desired character set. The methodology also enables email software to automatically display a message utilizing the proper character set or sets. This methodology further enables email software to automatically include in the email message sufficient information to meet the previously defined needs utilizing standard MIME conventions.

According to one aspect of the present invention there is provided a flexible flat file syntax that holds per-locale information about email, based on MIME conventions. The information in the file is used to build a database which may be used by email clients through a new Application Programming Interface (API). The contents of this file can also be configured by users to fit their individual and specific email needs.

According to another aspect of the present invention this, to same flat file also allows a knowledgeable user to provide a specification entitled "CHARSET-specification" which describes the appropriate code-converter to be used to convert the body of the message from one CHARSET to another any receiver's system.

In order to accomplish the features and advantages made available herewith, the present invention enables the creation of a set of APIs, which allow abstraction of locale-dependent properties of a message which can then be used by clients. By way of example, but not limitation, one such client is dtmail, available from Sun™ Microsystems, Palo Alto Calif.

The present invention implements a locale conversion library definition file, or LCL_DEF. LCL_DEF contains information to many email and MIME-specific attributes on a per-locale or a per-user basis. This information is then utilized by the LCL library to tailor the email handling behavior of the email client. The library itself obtains various kinds of information required to hide of locale-based details of a given message through a flexible text file format which can be edited by clients for client-specific email handling.

LCL_DEF is provided in a plain ASCII text format, so that a user can modify its contents easily. Accordingly LCL_DEF enables the user to customize the behavior of conversions performed by LCL library without changing the library itself.

These and other advantages of the present invention will become apparent upon reading the following detailed descriptions and studying the drawings.

BRIEF DESCRIPTION OF THE DRAWING

For more complete understanding of the present invention, reference is made to the accompanying drawings in the following Detailed Description of the Invention.

In the drawings.

Reference numbers refer to the same or equivalent parts of the invention throughout the drawings.

DETAILED DESCRIPTION OF THE PREFERRED EMBODIMENTS

While applicable to a wide variety of operating environments, the succeeding discussion will focus on implementing the principles of the present invention in a POSIX-compliant operating environment. More particularly, the succeeding discussion focuses on one implementation of the present invention as an extension to one POSIX-compliant email program, dtmail. Study of the principles enumerated herein will render evident to those having ordinary skill in the art alternative aspects of the present invention applicable to other operating environments in general and with other POSIX-compliant programs in particular. The principles of the present invention specifically contemplate all such implementations.

The present invention teaches a methodology that allows an email sender to view and/or send a message in substantially any desired character set. The methodology also enables email software to automatically display an email message utilizing the proper character set or sets. This methodology further enables email software to automatically include in the email message sufficient information to meet the previously defined needs utilizing standard MIME conventions.

Figure 1:
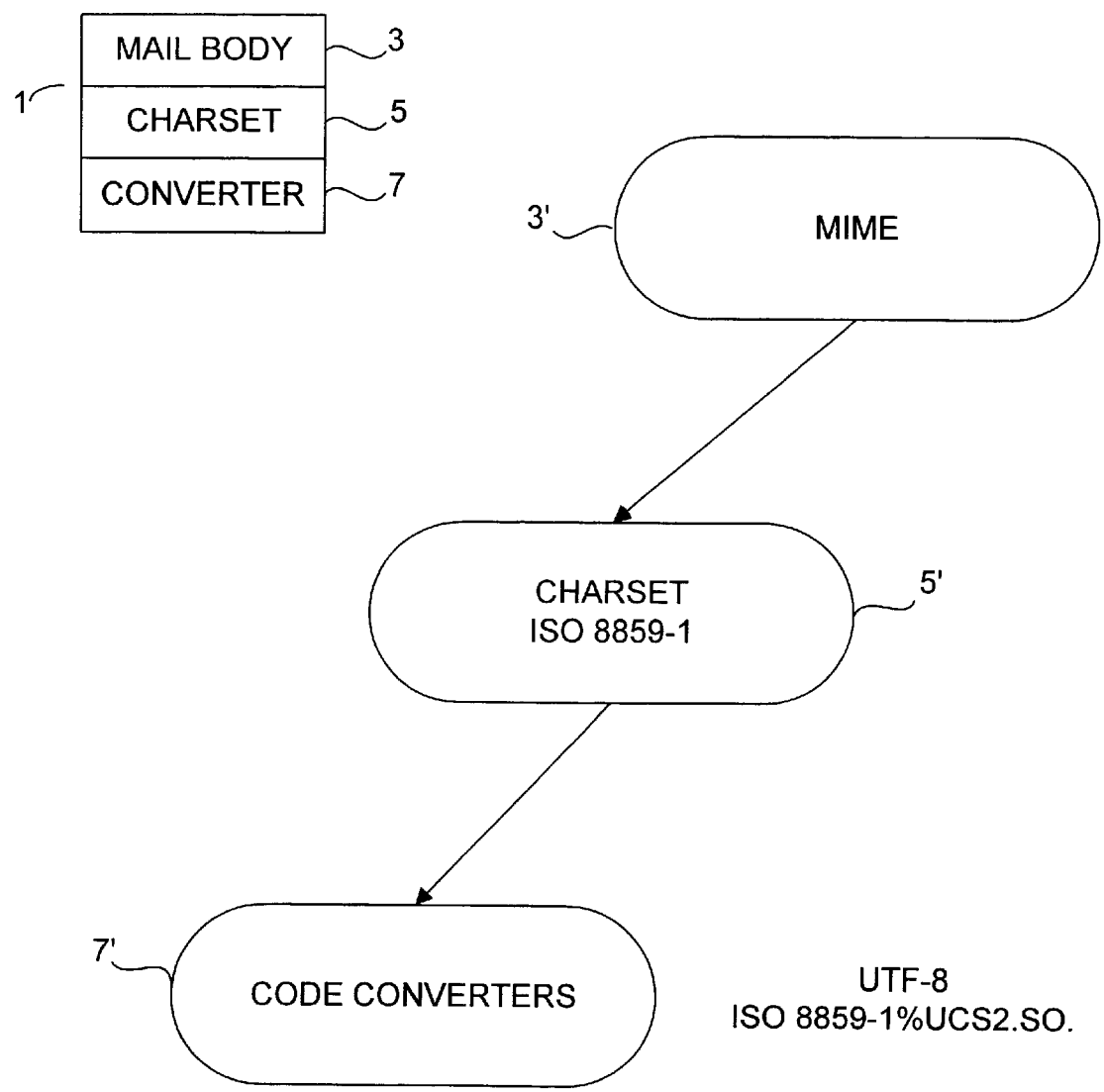
FIG. 1 is a logical representation of the flat file message of the present invention.

Referring now to FIG. 1, the present invention teaches a flexible flat file syntax, 1, that holds per-locale information about email, based on MIME conventions. Flat file 1 includes a MIME-compliant email body, 3, a CHARSET definition, 5, and converter specification, 7. In should be noted that the email body, 3 is fully MIME-compliant. The CHARSET definition, 5, implements substantially any standard CHARSET specification which follows the MIME convention, including but not limited to ASCII, IANA, ISO, and JIS. Finally, the converter specification is operating system dependent. Accordingly, the operating system locale or administrator is responsible for maintaining a text file that defines the available converters in the system.

Having continued reference to FIG. 1, one example flat file is shown. 3' contains the MIME-compliant email body previously discussed. Additionally, a CHARSET is specified at 5'. In this example, the specified CHARSET is an ISO 8859-1 character set. Finally, the code converter is specified. In this example, at 7', the code converter required to convert from ISO8859-1 to UCS2 is specified.

The information in the file is used to build a database which may be used by email clients through a new API. The contents of this file can also be configured by users to fit their individual and specific email needs.

In order to accomplish the features advantages made available herewith, the present invention enables the creation of a set of APIs which allow abstraction of locale-dependent properties of a message which can then be used by clients. By way of example, but not limitation, one such client is dtmail, available from Sun™ Microsystems, Palo Alto Calif.

The present invention implements a locale conversion library definition file, or LCL_DEF. LCL_DEF contains information to many email and MIME-specific attributes on a per-locale or a per-user basis. This information is then utilized by the LCL library to tailor the email handling behavior of the email client. The library itself obtains various kinds of information required to hide of locale-based details of a given message through a flexible text file format which can be edited by clients for client-specific email handling.

Figure 2:
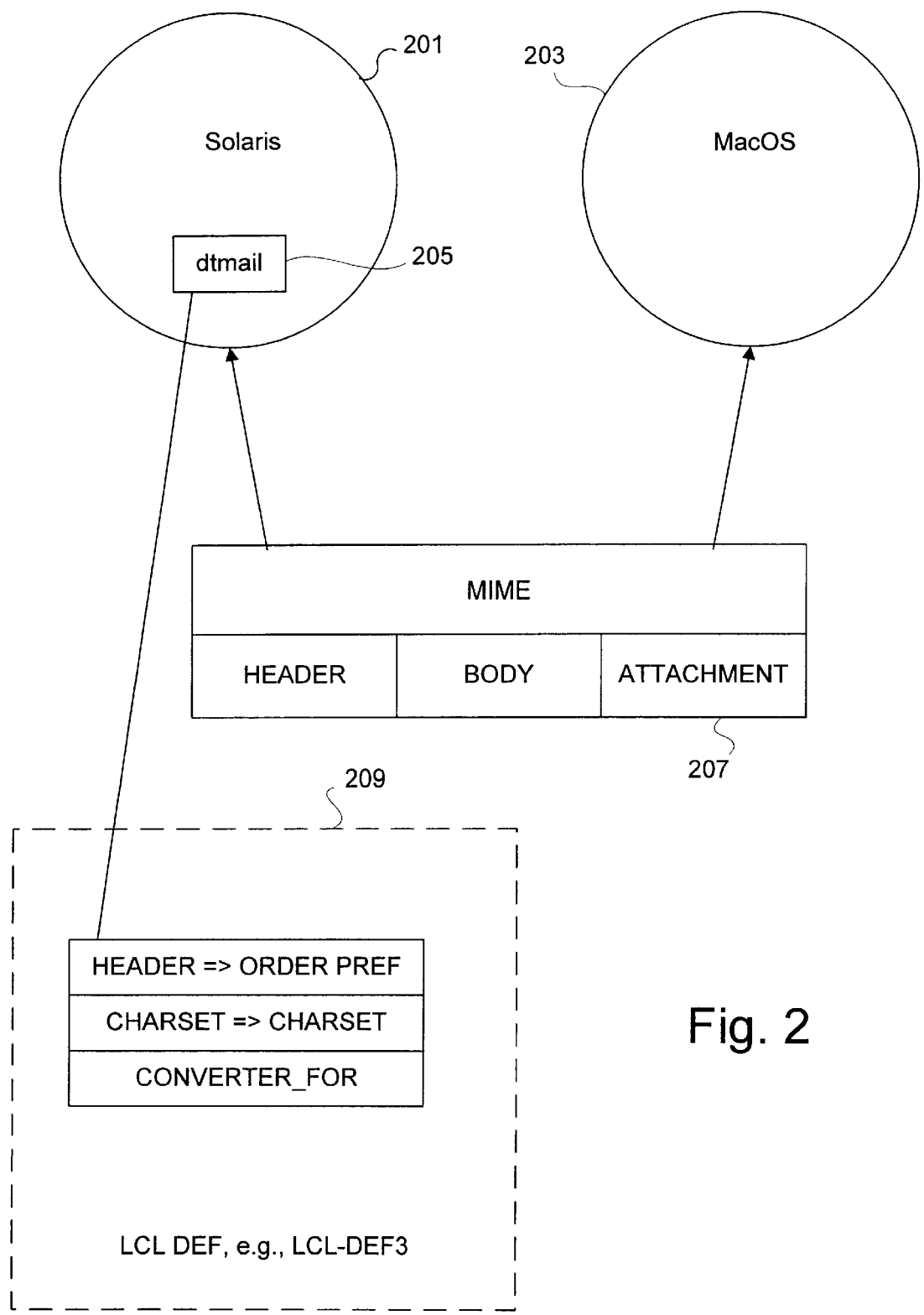
FIG. 2 is a logical representation of two users utilizing the present invention on different systems, showing the Locale Conversion Library utilized by one user.

LCL_DEF is shown at FIG. 2. With reference to that figure, two users, 201 and 203 operating dissimilar systems are exchanging an email message, 207. The email message is as previously described. The receiver's LCL_DEF file, 209 is named, in this example, LCL_DEF3, and comprises header information, including the order in which the receiver desires to attempt conversion of the message character set, CHARSET location data, and converter data.

LCL_DEF is provided in plain ASCII text format, so that a user can modify its contents easily. Accordingly LCL_DEF enables the user to customize the behavior of conversions performed by LCL library without changing the library itself.

The Locale Conversion Library definition file, or LCL_DEF, contains information pertaining to many email and MIME specific attributes on a per-locale or a per-user basis. This information is then used by the LCL library to tailor the email handling behavior of email client programs. including but not limited to the CDE email client dtmail.

The default location of LCL_DEF used on a per-locale basis should be placed in the system itself. Users specific files should be kept under the users home directory. The LCL databases are made up of categories which in turn consist of a class and associated sub classes.

The LCL database allows information to be provided for the following categories:

FORM_PART Information pertaining to a email in the MIME form.

CHARSET_PART Information pertaining to each supported MIME CHARSET.

ICONV_PART Information pertaining to code conversion (iconv).

A more detailed description of the type of information that can be provided for each of the categories is provided in sections that follow.

The FORM_PART category allows users to define information to a email in the MIME format. It contains MIME CHARSET and content transfer encoding (CTE) information for the message header, message body and message attachment respectively. The following are the subcategories for FORM_PART along with their expected values.

| class | description |
| --- | --- |
| objN | N = 0, 1, 2, . . . 64 |
| type | Mail Form type [1] |
| name | Name [2] |
| msg_header_charset | Preferred MIME CHARSET order for header |
| msg_body_charset | Preferred MIME CHARSET order for body |
| taggedtext_header_charset | Preferred MIME CHARSET order for attachment header |
| taggedtext_body_charset | Preferred MIME CHARSET order for attachment body |
| mail_type | Mail type [3] |

Mail Form Type
The following three types are available:

a. InComingStream
b. OutGoingStream
c. Display

Mail Form Name
Public name which is used as parameter of LCL library functions.
The following names are valid:

a. IncomingStreamForm — Incoming email
b. OutGoingStreamForm — Outgoing email
c. OutGoingStreamForm_V3 — Outgoing email (SunMailTool mode)
d. OutGoingStreamForm_V3_Attach — Outgoing email (SunMailTool mode attachment)
e. DisplayForm — For display
f. PrintForm — For printing The Mail Type specifies the protocol of the email format.
The following are supported:

a. MIME — Specifies RFC 822 MIME format
b. V3 — Specifies Openwindows V3 format
c. Unknown — Specifies that the format is unknown The following is an example of a typical FORM_PART:

```
obj1{
  type                      InComingStream
  name                      IncomingStreamForm
  ms_header_charset         SCII;UTF-8;ISO-8859-1;
                            ISO-8859-2;ISO-8859-3;
                            UNKNOWN
  msg_body_charset          ASCII;UTF-8;ISO-8859-1;
                            ISO-8859-2;ISO-8859-3;
                            UNKNOWN
  taggedtext_header_charset ASCII;UTF-8;ISO-8859-1;
                            ISO-8859-2;ISO-8859-3;
                            UNKNOWN
  taggedtext_body_charset   ASCII;UTF-8;ISO-8859-1;
                            ISO-8859-2;ISO-8859-3;
                            UNKNOWN
  mail_type                 MIME
}
```

The CHARSET_PART category defines all information related to the MIME CHARSET. The following sub-categories are supported:

| class | description |
| --- | --- |
| csN | N = 0, 1, 2, . . . 64 |
| name | Lcl library specific private name for the CHARSET |

-continued

| class | description |
| --- | --- |
| mime_name | Name as IANA or MIME registered |
| v3_name | Name used in V3 Mailtool format |
| iconv_name | Name used for code conversion(iconv) in Solaris |
| format | Character range information [1] |
| ascii_superset | Range information for ascii [2] |
| mime_header_name | Mime CHARSET name to be used for email header |
| mime_header_encoding | Encoding [3] to be used for header |
| mail_body_name | Mime CHARSET name to be used for email body |
| mail_body_encoding | CTE [3] to be used for email body |

The Format specifies a range type of the CHARSET. The following values are available:

| | |
| --- | --- |
| ASCII Text Range | [CR, LF, TAB, 0x20–0x7e] |
| 7BIT Text Range | [0x00–0x7f] |
| ISO_94_96 Text Range | [CR, LF, TAB, 0x20–0x7e, 0xa0–0xff] |
| ISO_94_Ext Text Range | [CR, LF, TAB, 0x20–0x7e, 0x80–0xff] |
| MB_String | Multi-byte string representation of the locale This information is used to determine (or guess) the CHARSET name from the text contents. |

ASCII_superset specifies the ASCII range of the CHARSET. The following values are available:

True Ranges are identical to ASCII.

If this is True, then the LCL library bypasses the conversion between two CHARSETs both of which have specified ascii_superset as True and if the contents are only ASCII.

Encoding or Content Transfer Encoding is defined as per RFC822. The following values are valid:

| | |
| --- | --- |
| a. QuotedPrintable | Quoted-Printable encoding |
| b. Base64 | Base64 encoding |
| c. Default | Use the value specified in CHARSET_PART sub-category |
| d. None | Do not encode |

An example of a typical CHARSET_PART is presented as follows:

```
cs25 {
    name                 KO18-U
    mime_name            KO18-U
    v3_name              KO18-U
    iconv_name           KO18-U
    mail_header_encoding Quoted-Printable
    mail_body_encoding   Quoted-Printable
    ascii_superset       True
}
```

The ICONV_PART category defines the iconv information with which the code conversion is performed. It has the following valid sub-categories:

| class | description |
|---|---|
| convN | N = 0, 1, 2, . . . 64 |
| encoding | Source and Target CHARSET names (private) as used in LCL_DEF* |
| conversion | Source and Target CHARSET names used in Solaris iconv interface* |
| direction | direction of the conversion [1] |

*Only names which are specified in CHARSET_PART subcategory "name" are to be used. Source CHARSET name and target CHARSET name are separated by a separator ";" in the following format: source_charset;target_charset For the conversion from source_charset to target_charset, iconv modules are called from left to right as specified here. For example, the value "iconv1;iconv2;iconv3" means that the following iconv calls are generated:

(1) iconv 1% iconv2

(2) iconv2% iconv3

Direction specifies if the iconv conversion is reversible or not. The following value is valid:

Both.

The conversion is reversible. If specified as both conversion to and from source to target is possible.

An example for a typical ICONV_FORMAT is as below:

| conv21 { | |
|---|---|
| encoding | ISO-8859-14;UTF-8 |
| conversion | ISO-8859-14;UTF-8 |
| direction | Both |
| } | |

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. In particular, the principles of the present invention specifically contemplate the incorporation of one or more of the various features and advantages taught herein on a wide variety of systems and devices. Each of these alternatives is specifically contemplated by the principles of the present invention.

What is claimed is:

1. Utilizing standard MIME conventions, a methodology for enabling an e-mail sender to view and send an email message in any desired standardized character set, the method comprising the steps of:

composing the email message;

providing a library including a plurality of conversion library definition files;

accessing the library to define the character set definition and an identifier of a code converter required for converting the email message from a first standardized character set to a second standardized character set;

including in the email message a flat file further defining a mail body, the character set definition, and the identifier of the code converter required for converting the email message, the mail body including the email message.

2. Apparatus for enabling an e-mail sender to view and send an email message in any desired standardized character set, the apparatus comprising;

an email composition program implemented on a computer;

a library including a plurality of conversion library definition files; and a utility for generating a flat file including a mail body further including the email message, a character set definition, and an identifier of a code converter required for converting the email messa from a first standardized character set to a second standardized character set, the flat file implementing standard MIME conventions.

3. A methodology as recited in claim 1, wherein at least one of the plurality of conversion library definition files is in plain ASCII text format.

4. A methodology as recited in claim 1, wherein the character set definition is one of: ASCII, IANA, ISO, or JIS.

5. A methodology as recited in claim 1, wherein composing the email includes:

using a Posix compliant email program to compose the email.

6. A methodology as recited in claims 5, wherein the Posix compliant email program is dtmail.

7. A methodology as recited in claim 5, wherein the code converter required for converting the email message is operating system dependent.

8. An apparatus as recited in claim 2, wherein the converter specification is used to define preferences with respect to the conversion.

9. An apparatus as recited in claim 2, wherein the apparatus further includes a library and a conversion library definition file.

10. An apparatus as recited in claim 2, wherein at least one of the plurality of conversion library definition files is in plain ASCII text format.

11. An apparatus as recited in claim 2, wherein the character set definition is one of: ASCII, IANA, ISO, or JIS.

12. An apparatus as recited in claim 2, wherein the email composition program is a Posix compliant email program.

13. An apparatus as recited in claim 12, wherein the Posix compliant email program is dtmail.

14. An apparatus as recited in claim 2, wherein the converter specification is operating system dependent.

15. Utilizing standard MIME conventions, a method of automatic exchange of email messages between email users, the method comprising:

providing an email Application Programming Interface;

providing an email database which includes information pertaining to an e-mail in a MIME form, information pertaining to each of supported MIME character sets, and information pertaining to code conversion between each of the supported MIME character sets;

composing an email message;

accessing the email database using the email Application Programming Interface to obtain information needed to compose an email message that is to be sent from a first client using a first standardized character set to a second client using a second standardized character set which is different from the first standardized character set used by the first client;

generating a flat file based on the information obtained from the email database, the flat file defining a mail body, a character set definition, and an identifier of a code converter required for converting the email message from the first standardized character set to the second standardized character set, whereby the flat file provides information that can be used to convert the message in accordance with requirements of the second client; and sending the flat file to the second client.

16. A method as recited in claim 15, wherein the method further comprises:

using the flat file to convert the email to the second standardized character set.

17. A method as recited in claim 15, wherein the method further comprises:

accessing another email database to convert the email to the second standardized character set.

18. A method as recited in claim 15, wherein the email database further includes user preferences with respect to character set conversion.

19. A method as recited in claim 15, further comprising:

using a dtmail client to access the email Application Propramming Interface.

* * * * *

UNITED STATES PATENT AND TRADEMARK OFFICE
CERTIFICATE OF CORRECTION

PATENT NO. : 6,754,694 B1
DATED : June 22, 2004
INVENTOR(S) : Hiura et al.

It is certified that error appears in the above-identified patent and that said Letters Patent is hereby corrected as shown below:

Column 8,
Line 8, change "messa" to -- message --.
Line 21, change "claims" to -- claim --.

Column 10,
Line 8, change "Propramming" to -- Programming --.

Signed and Sealed this

Twenty-first Day of September, 2004

JON W. DUDAS
*Director of the United States Patent and Trademark Office*